(12) United States Patent
Osborn

(10) Patent No.: US 8,758,597 B2
(45) Date of Patent: Jun. 24, 2014

(54) RECLAIMED ASPHALT PAVEMENT

(76) Inventor: John D. Osborn, Scott, LA (US)

( * ) Notice: Subject to any disclaimer, the term of this patent is extended or adjusted under 35 U.S.C. 154(b) by 559 days.

(21) Appl. No.: 12/583,437

(22) Filed: Aug. 20, 2009

(65) Prior Publication Data

US 2010/0048771 A1 Feb. 25, 2010

Related U.S. Application Data

(60) Provisional application No. 61/189,728, filed on Aug. 22, 2008.

(51) Int. Cl.
*C10G 29/00* (2006.01)
*C08L 95/00* (2006.01)
*C09D 195/00* (2006.01)
*C10C 3/00* (2006.01)
*C10C 3/06* (2006.01)
*C10C 3/08* (2006.01)

(52) U.S. Cl.
USPC .............. 208/41; 208/39; 208/45; 208/177; 208/179; 208/181; 208/184; 524/59; 106/273.1

(58) Field of Classification Search
CPC .......... C10G 29/00; C10G 2300/1003; C10G 2300/1074; C08L 95/00; C08L 95/005; C09D 195/00; C09D 195/005; C10C 3/00; C10C 3/06; C10C 3/08
USPC ........ 428/143; 208/39, 41, 45, 177, 179, 181, 208/184; 524/59; 106/273.1
See application file for complete search history.

(56) References Cited

U.S. PATENT DOCUMENTS

| | | | |
|---|---|---|---|
| 6,194,519 B1 * | 2/2001 | Blalock et al. | 525/232 |
| 6,270,657 B1 * | 8/2001 | Moore et al. | 208/179 |
| 2003/0207101 A1 * | 11/2003 | Huege et al. | 428/323 |
| 2007/0231545 A1 * | 10/2007 | Ruan | 428/143 |

OTHER PUBLICATIONS

Jonathan V.L. Kiser: Asphalt rubber, Scrap.org, Feb. 2003.*

* cited by examiner

*Primary Examiner* — James J Seidleck
*Assistant Examiner* — Deve E Valdez
(74) *Attorney, Agent, or Firm* — Strasburger & Price, LLP

(57) ABSTRACT

A saturated elastomeric mixture is disclosed having a cured or vulcanized elastomer crumb rubber and atmospheric distillations bottoms residue is disclosed.

5 Claims, 3 Drawing Sheets

US 8,758,597 B2

RECLAIMED ASPHALT PAVEMENT

CROSS-REFERENCE TO RELATED APPLICATION

This application claims benefits from U.S. provisional application Ser. No. 61/189,728 filed Aug. 22, 2008, the entire contents of which are incorporated herein by reference.

BACKGROUND OF THE INVENTION

1. Field of the Invention

This invention relates to a process for absorbing refinery fractions for modified asphalt.

2. Description of the Related Art

Reclaimed asphalt pavement, "RAP", has been used as an aggregate in hot recycling of asphalt paving mixtures. A common method is to combine RAP with virgin asphalt and aggregate in either a continuous plant (Drum) or batch (Pug Mill) central mixing plant(s) producing new pavement mixtures. In the United States these combined mixtures are generally restricted to a maximum content of about 50%, more commonly from 10% to about 25% of "RAP" due to a decrease in pavement performance as the RAP content is increased. Specifications for asphalt vary state to state, but the most common area of use is the base course of paving construction. General restrictions in this method relate to the milled size of the "RAP" and the ability to generate appropriate heat into the mixtures. Batch ("Pug Mill") mixing systems tend to be better able to introduce heat and to control this factor than the continuous (Drum) mixing systems. Because of the high temperatures required to recycle high percentages of RAP materials into pavements, gaseous hydrocarbon emissions are also a limiting factor.

Hot in-place recycling "HIPR", only used on a limited basis as set out below, involves the removal, rejuvenation, and replacement of the top 1-inch (25 mm) of the pavement. Remixing involves the use of some new aggregate as well as additional virgin asphalt binder combined in a Pug Mill, allowing for the placement of up to two inches of surface pavement. Three basic processes are recognized by the Asphalt Recycling and Reclaiming Association, "ARRA": 1. heater-scarification (multiple pass), 2. repaving (single pass), and 3. remixing. The primary advantage of in-place recycling is cost savings. Stockpiling RAP is not necessary so there is no need to transport large quantities of milled old pavement. The quantity of new materials is also substantially reduced. The general description of rejuvenation agents, or new material, is described as follows: 1. Paraffinic fractions 2. Napthenic fractions (aromatic). 3. "Super Soft" asphalts. These rejuvenation products consist of organic compounds produced as extracts during the crude oil refining process.

Several technical difficulties are posed when attempting to recycle "RAP" into performance pavements and high percentage road base mixtures. These issues include a high energy required to heat the "RAP" into a useful temperature, "VOC" emissions due to high temperatures, the loss of binder properties in the asphalt due to high levels of oxidation, chemical compatibility with virgin asphalt binders, and improper aggregate size with the newly-specified mix designs. The most significant problem is establishing high percentage "RAP" mixtures which exhibit excellent properties of adhesion, cohesion and compaction.

Today's high price of crude oil has created very aggressive refining practices. This has led to the asphalt, the last fraction of the refining process, being reduced in quality. Oil companies replenish these asphalts to meet current specifications by adding percentages of aromatic, paraffinic and napthenic fractions as well as various polymers. These additions allow the virgin asphalt binder to meet the temperature failure points required by various states' current pavement construction performance grade, "PG", specifications. Another problem faced in the prior art is the common polymer employed for asphalt modification is Styrene-Butadiene-Styrene, "SBS". Aggressive refining practices, diverting butadiene streams into gasoline production as one example, has led to first-time worldwide shortage of "SBS". See "SBS Polymer Supply Outlook" by Romugasa, et al, a publication of The Association of Modified Asphalt Products, describing a wet process (highlight 3, last page of article) as the response to the shortage, unlike the method of the present invention (while this article is not prior art, it does show the thinking of those skilled in the art as of August 2008.) This is providing difficulties both for the roofing and paving industries in producing quality electrometrically-modified products.

Beside the polymer discussed above, which is old in the arts, another method of modifying virgin asphalt binder is to blend ground scrap tire rubber (Crumb Rubber) with the asphalt. The Federal Highway Administration, "FHWA", uses the terminology "CRM", crumb rubber modifier for this application. The most common method is to blend rubber from 15%-22%, by weight of the asphalt, with the asphalt binder. These formulations are generally done as a recipe rather than as the more common performance specifications used by most states. The process is commonly referred to as the "Arizona Wet Process" and involves blending the crumb rubber at temperatures from 375° F. to 425° F. with the virgin asphalt binder until a stable viscosity is achieved. Variations of this process have been in use since the late 1960s. Vestamer® thermoplastic binder has been used in "Dry Blend" applications with CRM where the crumb rubber and Vestamer® are combined and added to the pavement mixture after the aggregate and asphalt binder have been mixed. U.S. Pat. No. 6,346,561 discloses a combination of tall oil fractions, crumb rubber and gilsonite to produce a mixture suitable to modify the temperature performance of asphalt binder in either "wet" or "dry" applications. None of the above-mentioned CRM-derived modifiers demonstrate or anticipate any ability to aid in the recycling of asphalt pavement. CRM modifiers typically consist of approximately 30% rubber hydrocarbon and approximately 70% filler agents such as, but not limited to, various clays, carbon black, and processing aides used in the tire manufacturing process. As a result of these filler agents. CRM-modified dense grade pavement mixes tend to avoid fatigue cracking by compensating with increased asphalt binder in these mixes.

It is well-known in the art to use tall oil with ground rubber waste for re-use as rubber. See "Ground Rubber Waste—A Supplementary Raw Material for the Rubber Industry" issued by Kahl & Co.; U.S. Pat. No. 4,481,335, issued Nov. 6, 1984 to Stark, Jr. entitled "Rubber Composition and Method"; U.S. Pat. No. 3,873,482, issued Mar. 25, 1975 to Severson et al, entitled "Pyrolyzed Tall Oil Products as Synthetic Rubber Tackifiers"; U.S. Pat. No. 4,895,911, issued Jan. 23, 1990 to Mowdood et al, entitled "Tall Oil Fatty Acid Mixture in Rubber"; U.S. Pat. No. 4,792,589, issued Dec. 20, 1988 to Colvin et at, entitled "Rubber Vulcanization Agents of Sulfur and Olefin"; and U.S. Pat. No. 4,244,841, issued Jan. 13, 1981 to Frankland, entitled "Method for Recycling Rubber and Recycled Rubber Product". Generally, for the area of ground polymer elastomer operation, see U.S. Pat. No. 4,771,110, issued Sep. 13, 1988 to Bouman et al, entitled "Polymeric Materials Having Controlled Physical Properties and Purposes for Obtaining These"; and for rubber discussions see U.S. Pat. No. 3,544,492, issued Dec. 1. 1970, to Taylor et al, entitled "Sulfur Containing Curing Agents"; and "Organic Chemistry" by Fieser and Fieser, printed 1944 by D.C. Heath & Co. Boston, pages 346 and 347. See also U.S. Pat. No. 2,082,607, issued Sep. 1, 1936 to Cowdery, entitled "Rubber Compounding Material and Method of Using" and U.S. Pat. No. 2,133,690, issued Oct. 13, 1938 to Epstein, entitled "Rubber and Method of Making the Same".

SUMMARY OF THE INVENTION

This invention utilizes the amorphous nature of ground rubber from scrap tires to absorb various refinery fractions, recycled oils and long chain waxes to enhance the ability to recycle asphalt pavements, asphalt-based roofing products as well as modify the performance characteristics of neet asphalt. Methods required to manufacture the invention are also disclosed.

The invention combines one variable composition which modifies the elastomeric properties, chemical properties, working temperature, processing characteristics and dramatically affects the ability to recycle asphaltic materials. The invention offers several methods to introduce these elements into asphalt manufacturing or recycling systems as well as to pre-establish compatibility with asphalt.

A primary constituent of the invention is crumb rubber derived from processing of scrap tires. The preferred crumb rubber should be substantially free of contaminants such as fabric or steel and can be produced by either ambient grinding or cryogenic fracturing. Additional constituents are refinery fractions from the refining of crude oil. These include but are not limited to paraffinic distillates, solvent extracts, aromatic extracts, asphalt resins and used motor oil. The crumb rubber is first combined under heat and if necessary shear mixing with selected components of the above refinery fractions, pre-tested for compatibility and requirements of the base asphalts(s), at rates of up to 50% by weight of rubber, forming a globular mass. The composition is then enhanced by adding up to 25%, by weight, of a long-chain aliphatic wax with a melting point in the range of 158° F. (70° C.) to 248° F. (120° C.). The mixture is then cooled with the aliphatic wax sealing the crumb rubber particle, yielding a highly saturated, free-flowing hydrophobic granular solid.

The described invention can then be applied into recycled asphalt or neet asphalt by several methods: 1. Dry-blended into pre-heated "RAP" to create a 100% recycled paving mixture. 2. Dry-blended with the "RAP" then added to new materials at the asphalt paving mix plant allowing for higher percentage of "RAP" utilization than previously possible. 3. Dry-blended with the aggregate to modify the neet asphalt during the mix cycle at a hot mix asphalt plant. 4. Wet-blended with the neet asphalt in a finishing tank prior to adding aggregate to produce a PG-graded asphalt.

The invention will blend at an accelerated rate due to the swelling induced during the invention's manufacturing cycle, requiring less time and energy than other "CRM" modifiers to incorporate with either oxidized or neet asphalt. The long-chain aliphatic wax component also incorporates a lowering of asphalt binder viscosity into the pavement materials reducing required application temperatures and aiding compaction in paving mixtures.

DESCRIPTION OF THE DRAWINGS

For a further understanding of the nature and objects of the present invention, reference should be made to the following drawings in which like parts are given like reference numerals and wherein.

DESCRIPTION OF PREFERRED EMBODIMENTS

Figure 1:
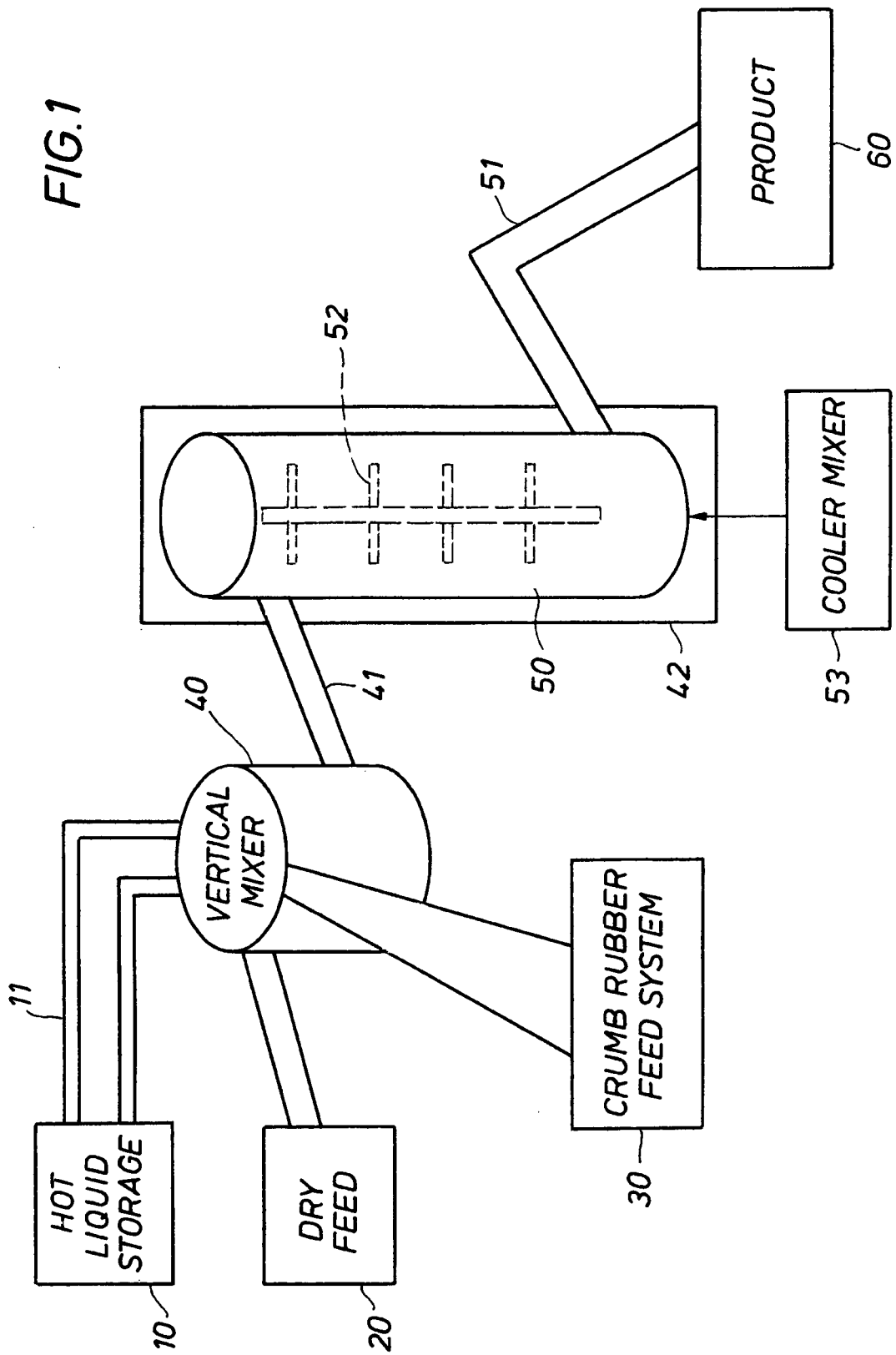
FIG. 1 is a depiction of a first embodiment of the present invention using a high intensity vertical mixer.

This invention discloses adjustable formulations for the rejuvenation and/or modification of overly-oxidized as well as neet asphalt binders. The invention also describes flexible methods to employ the invention in asphalt production systems.

This invention's use as an additive to overly-oxidized as well as neet asphalt binder had as its primary component cured crumb rubber, preferably primarily derived from the ambient or cryogenic processing of scrap tire feedstock. Additional cured crumb rubber may also be comprised of ethylene-propylene dien rubber (EPDM), styrene butadiene rubber (SBR), natural rubber (NR), and isoprene rubber (IR). The preferred crumb rubber useful in this invention ranges in SAE mesh size from about 10 to 400 and more preferably from 30 to 200. The modified crumb rubber in this invention functions in three ways: 1. A heat-activated accelerated blending crumb rubber modifier, "CRM", useful in either "wet" or "dry" applications 2. A carrying agent of various petrochemical streams, produced during crude oil refining or motor oil recycling, modifying neet or highly oxidized asphalt's physical characteristics. 3. A processing aid enhancing compatibility and lowering processing temperatures for blending and compacting or neet or oxidized asphalt-paving materials.

This invention's additional component(s) include various ingredients that result from the refining of crude oil either singularly or in combination which are dependent on the requirements of the base neet asphalt or "RAP".

Asphalt or asphalt cements maybe generated by: (1) simple or atmospheric distillation of light boiling fractions away from select crude oils, yielding an atmospheric bottoms residue with a boiling range of 650° F. or above and (2) through vacuum distillation of atmospheric bottoms at pressures lower than atmospheric pressures, yielding a vacuum tower bottoms with a boiling range between 650° F. and 1050° F.

General Definitions:

"Aromatic Extracts" are a complex combination of hydrocarbons and aromatics obtained from the refinery streams produced by the processing of crude oil and consist predominantly of aromatic hydrocarbons having carbon numbers in the range of C20-50.

A "heavy paraffinic distillate or solvent extract" is aromatic oil readily obtained by extracting a naphthenic or paraffinic rich feed such as distillate with aromatic extraction solvents at temperatures in the range from about 50° C. to about 150° C. in extraction units known in the refining industry. Typical aromatic extraction solvents include N-methylpyrrolidone, phenol, N-N-dimethylformamide, dimethylsulfoxide, methylcarbonate, morpholine, furfural, and the like and preferably N-methylpyrrolidone or phenol. Solvent-to-oil treat ratios are generally about 0.5:1 to about 3:1. The extraction solvent preferably contains water in the range of about 1 vol. % to about 20 vol. %.

Basically the extraction can be conducted in a counter-current type extraction unit. The resultant aromatic rich solvent extract stream is then solvent stripped to provide aromatic extract oil having an aromatic content of about 50% to 90% by weight of the aromatic.

These highly aromatic oil compositions, also known as distillate aromatic extracts, have very high aromatic contents and are obtained as a by-product of the process of solvent extraction of vacuum distillates used a raw material for the manufacture of lubricant base oils.

By the term "aromatic" it is meant a molecule composed primarily or carbon and hydrogen which comprises at least one ring which is composed of conjugated unsaturated carbon bonds.

Some typical materials useful in this invention are: Citgo Petroleum Corporations Procoil 650 and Marathon Oil Corporation's MAP 325 aromatic extracts. Two products also useful in this invention are provided by Total Petrochemicals USA, Inc. These products, produced by vacuum tower crude oil refining, are De-Metallized Oil, "DMO" and Resins, "R". Total "DMO" and "R" are briefly described as follows:

"De-Metallized Oil" (DMO), is a solvent extract fraction of Vacuum Tower Bottoms (VTBs) composed primarily or cyclic saturated and aliphatic hydrocarbons. The extract is typified by a Penetration in excess of 400 dmm and a Flash Point above 550° F.

The penetration grading system was developed in the early 1900s to characterize the consistency of semi-solid asphalts. Penetration grading utilizes a needle under a given weight, temperature and time, typically 100 grams, 25° C. (77° F.), and five seconds; then measures the "penetration" depth of the needle. Penetration utilizes measurement increments of 0.1 mm thus a penetration of 8 mm would have a penetration number of 80.

"Resins" is a solvent extract fraction of Vacuum Tower Bottoms (VTBs) composed primarily of napthenic and aromatic hydrocarbons. The extract is typified by a Penetration between 200 and 260 dmm and a Flash Point above 550° F.

Used motor oil is also useful in this invention in that by blending it with crumb rubber it also accelerates the blending cycle of crumb rubber with asphalt and is believed to benefit "RAP" and recycled asphaltic roofing materials whose asphalt has a typical centipoise viscosity from 200,000 to 400,000.

Paraffin and Microcrystalline waxes are used by the invention to seal the crumb rubber particles making the mixture(s) free-flowing, thereby easier to handle and feed into asphalt manufacturing systems. Several waxes including wax manufactured by the "Fischer Tropsch Process" have also shown some benefit in reducing processing temperature. "Fischer Tropsch Process" wax tested in this invention is produced by Shell Oil Company and is typified by long-chain aliphatic hydrocarbon with a molecular chain length from 40-115 carbon atoms. The Shell Oil Company wax tested in this invention is designated as S-15 Microcrystalline Waxes, known to be beneficial in the manufacture of new tires are defined by "The International Group, Inc.", a large supplier of waxes useful to this invention:

"Microcrystalline wax is a refined mixture of solid, saturated aliphatic hydrocarbons, produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, and this directly impacts many of the physical properties. Microcrystalline waxes are tougher, more flexible and generally higher in melting point than paraffin wax. The fine crystal structure also enables microcrystalline wax to bind solvents or oil, and thus prevent the sweating-out of compositions.

The general consideration for the waxes used in this invention to seal the rubber particles is the melting point which is preferably at or above 140° F. (60° C.).

The preferred method to manufacture appropriate asphalt requires either high intensity or mixing system, preferably a vertical high intensity or horizontal medium intensity batch mixer capable of generating internal temperatures of 350° F. (177° C.) followed by a horizontal cooler mixer capable of cooling the mixture to a temperature at discharge of between 80° F. (27° C.) and 100° F. (38° C.). Continuous heated power screw mixers followed an auger with a cooling jacket may also be used. Either mix system needs to be equipped with hot metered liquid feed systems capable of spraying liquid materials into the mix chamber at temperatures of 300° F. (149° C.). A prominent company that manufactures this type of equipment is Littleford Day, Inc., located in Florence, Ky.

Figure 2:
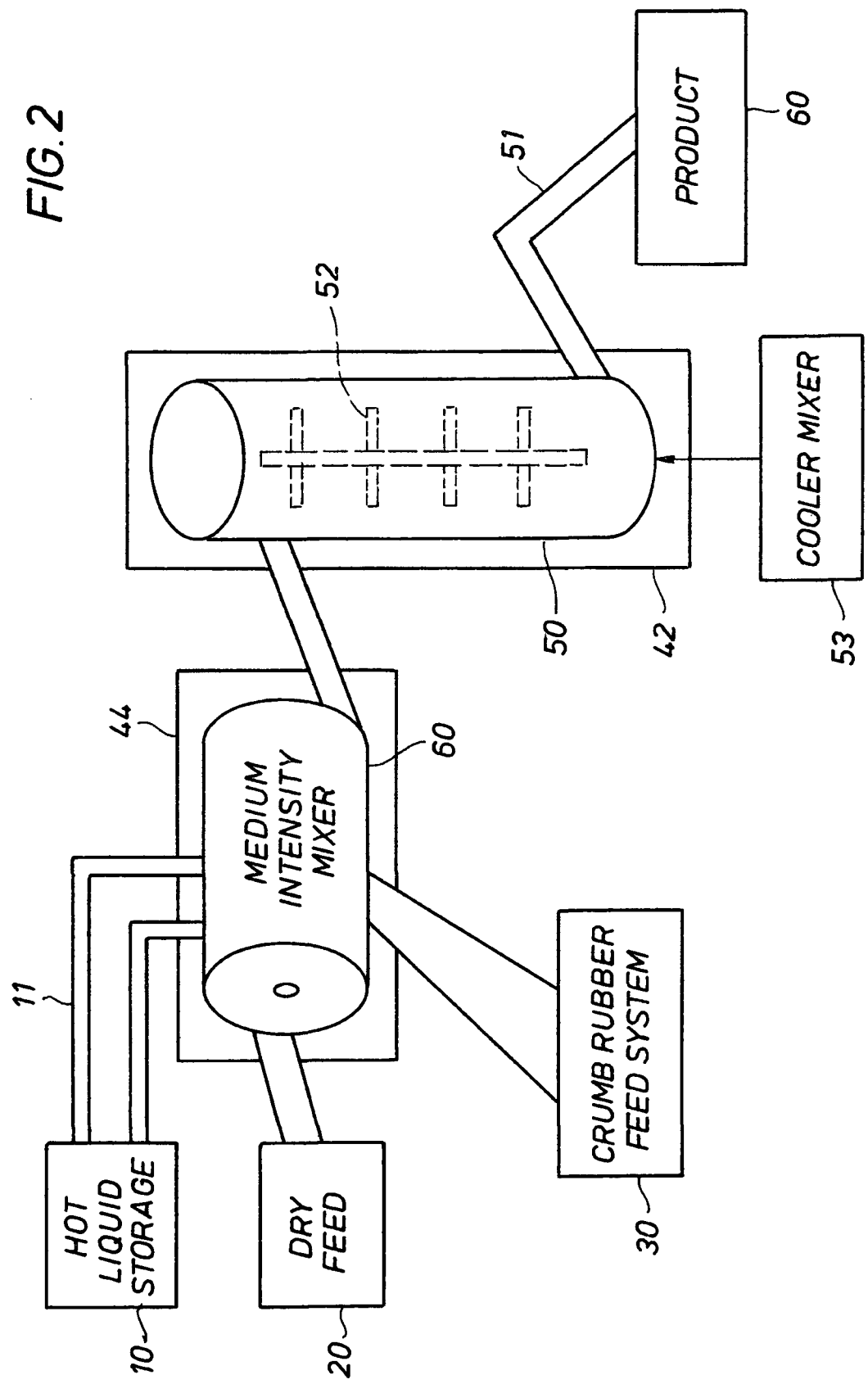
FIG. 2 is a depiction of a batch system of a second embodiment of the present invention using a horizontal medium intensity mixer.
Figure 3:
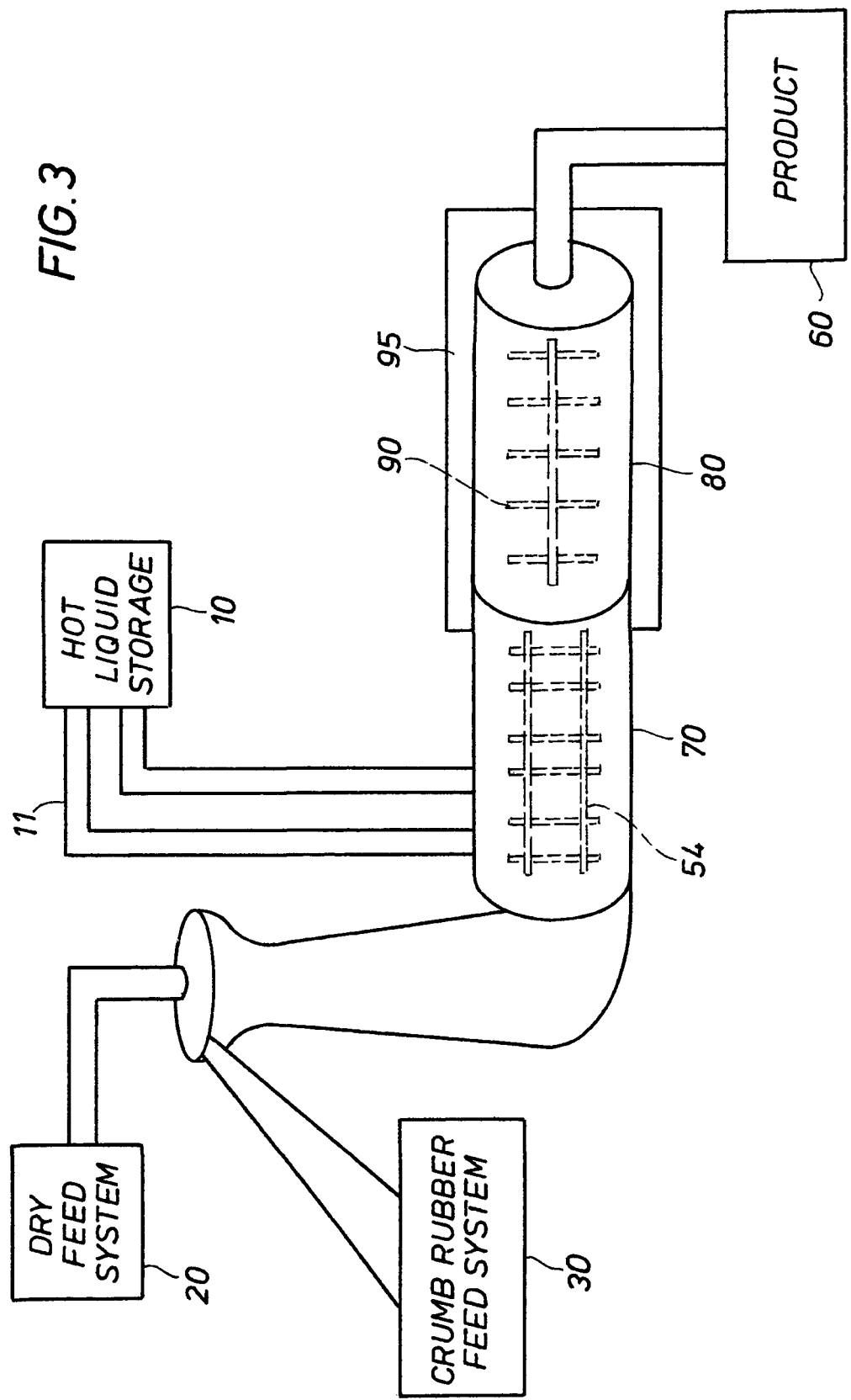
FIG. 3 is a depiction of a continuous mixing system of a third embodiment of the present invention.

FIGS. 1 and 2 represent a batch-mixing system(s) where crumb rubber feed system 30 feeds into a crumb rubber heated batch mixing chamber, preferably vertical, 40, or a batch medium intensity mixer 60 (FIG. 2). The hot liquid feed, such as asphalt resin, is fed from liquid storage 10 into mixing chamber 40 followed by dry feed material at 150° F. melt wax from dry feed tank 20 and supplemented by heating jacket 44. The heated mixer 40 is discharged 41 into cooler jacket 42 (FIG. 1) and mixer paddles 52 operated by a cooler mixer 53 for cooler mixer apparatus 50. The cooled mixture is then discharged 51 into product storage 60. FIG. 3 represents a continuous system with the same mixture flow but done on a continuous basis, for example, using chamber 70 with auger system 80 having an augur 90 with coating 95.

Experimental

Saturation test(s) to achieve functional levels of crumb rubbers ability to absorb various refinery factions were done with the following ingredients: 30-200 mesh crumb rubber produced from scrap tires was blended with Citgo Petroleum Corporation's Procoil 650 aromatic extract, Marathon Oil Corporation's MAP 325, Total Petrochemicals USA, Inc.'s "De-Metallized Oil" (DMO), IGI's R-3297A low melt paraffinic wax and Total Petrochemicals USA Inc.'s Resins, "R". Duel paddle mixing apparatus was set with one mix bowl heated to 250° F. (121° C.) and the other packed in ice. Four 300 gram samples of 30-200 mesh crumb rubber were prepared, one for each of the above-identified blends. Each crumb rubber sample was mixed for two minutes and heated to approximately 175° F. (80° C.). Then, subsequently, Procoil 650, MAP 325, DMO, IGI R-3297A and R were measured into 200-gram samples, then heated to 250° F. (121° C.), added to the crumb rubber and mixed for three minutes. The resulting mixtures were globular solids with a wet appearance.

At the end of each mix cycle 100 grams of Shell S-15 wax was heated to 250° F. (121° C.) and added individually to each mixture. Mixing was continued for one minute under heat then the mixtures were individually mixed in the cold mixer for two minutes. Each mixture transitioned from a globular mass to free-flowing particulate. The mixture discharge temperatures averaged 93° F. (34° C.).

Neet Asphalt Modification.

The following sample modifiers were prepared:

| Sample No. | Modified Crumb Rubber |
|---|---|
| 1 | 30-200 mesh crumb rubber with 20% by weight content of Total Resin |
| 2 | 30-200 mesh crumb rubber with 10% by weight content of Total Resin |

| Sample No. | Modified Crumb Rubber |
|---|---|
| 3 | 30-200 mesh crumb rubber with 10% by weight content of Total DMO |
| 4 | 30-200 mesh crumb rubber with 20% by weight content (10/10 Total DMO/Total Resin |
| 5 | 30-200 mesh crumb rubber with 20% by weight content (10/10) Total Resin/MAP 325 |

Total Petrochemicals USA Inc. PG 64-22 neet asphalt was used as the base asphalt. Twelve percent (12%), by weight, of each of the above CRM-saturated modifiers were added to five one-half gallon samples of the neet asphalt. The mixtures were added by stirring into the asphalt for 15 minutes with the asphalt heated to 325° F. (163° C.). The samples were then sent to the lab for rheology. Below are the results:

Following is a summary chart of these results:

| Summary Chart | Units | 1 | 2 | 3 | 4 | 5 |
|---|---|---|---|---|---|---|
| Binder DSR | °C. | 78.9 | 77.8 | 77.1 | 75.5 | 76.9 |
| RTFO DSR | °C. | 76.8 | 75.3 | 72.8 | 72.5 | 73.9 |
| PAV DSR | °C. | 13.6 | −2.0 | 8.1 | 9.9 | 18.3 |
| m-Value* | °C. | −29.47 | −29.31 | −31.5 | −28.3 | −25.1 |
| S-Value* | °C. | −28.82 | −28.52 | −29.5 | −28.9 | −27.7 |
| "Spread" | °C. | 105.6 | 103.8 | 102.3 | 100.8 | 99.1 |
| 24-hour Compatibility | °F. | 12.9 | 11.6 | 15.8 | 17.2 | 5.5 |
| 48-hour Compatibility | °F. | | | | | |
| 135° C. Viscosity | Pa * s | 0.72 | 0.65 | 0.678 | 0.625 | 0.538 |

| Crumb Rubber Modified Asphalt Rheology | | | | | | |
|---|---|---|---|---|---|---|
| | | Sample Number | | | | |
| | Spec | 1 | 2 | 3 | 4 | 5 |
| Test on Original Binder | | | | | | |
| Dynamic Shear G*/Sin Delta, (kPa) AASHTO T 315 | 1.00+ @ 64° C. | | | | | |
| | 1.00+ @ 76° C. | | | | 0.952 | |
| | 1.00+ @ 82° C. | 0.76 | 0.68 | 0.658 | | 0.629 |
| Rotational Viscosity @ 135 C, (Pa · s) AASHTO T 316 | 3.0 | 0.72 | 0.65 | 0.678 | 0.625 | 0.538 |
| Tests on RTFO | | | | | | |
| Dynamic Shear G*/Sin Delta, (kPa) AASHTO T 315 | 2.20+ @ 64° C. | | | | | |
| | 2.20+ @ 76° C. | | 2.06 | 1.62 | 1.56 | 1.78 |
| | 2.20+ @ 82° C. | 1.35 | | | | |
| Tests on RTFO PAV | | | | | | |
| Dynamic Shear G * Sin Delta, (kPa) @ 25° C. AASHTO T 315 | 5000− | 5420 @ 13° C. | 4700 @ −2° C. | 5870 @ 7° C. | 7550 @ 7° C. | 6940 @ 16° C. |
| Bending Beam Creep Stiffness, S, (MPa) @ −6° C. AASHTO T 313 | 300− | | | | | |
| Bending Beam Creep Stiffness, S, (MPa) @ −12° C. AASHTO T 313 | 300− | 83 | 84.9 | 74.1 | 83.4 | 121 |
| Bending Beam Creep Stiffness, S, (MPa) @ −18° C. AASHTO T 313 | 300− | 526 | 629 | 512 | 605 | 634 |
| Bending Beam Creep Stiffness, S, (MPa) @ −24° C. AASHTO T 313 | 300− | 526 | 629 | 512 | 605 | 634 |
| Bending Beam Creep Slope, m-value @ −6° C. AASHTO T 313 | 0.30+ | | | | | |
| Bending Beam Creep Slope m-value @ −12° C. AASHTO T 313 | 0.30+ | 0.430 | 0.454 | 0.454 | 0.427 | 0.375 |
| Bending Beam Creep Slope m-value @ −18° C. AASHTO T 313 | 0.30+ | 0.322 | 0.319 | 0.319 | 0.304 | 0.265 |
| Bending Beam Creep Slope m-value @ −24 C. AASHTO T 313 | 0.30+ | 0.232 | 0.232 | 0.286 | 0.22 | |
| Test on Compatibilities | | | | | | |
| Soft Point | 24 hr 4° F. | 12.90 | 11.60 | 15.8 | 17.2 | 5.5 |
| CRM PG Grading | | | | | | |

The base asphalt had a PG 64-22 grading or an 86° C. temperature spread between high and low temperature failure points. The treated CRM-modified asphalt had improvements on both the high and low temperature failure points with the widest spread being 105.60° C.

Sample 1 with the highest content of asphaltine-rich asphalt resin demonstrates an ability to substitute for a solid substance such as gilsonite, with a liquid agent. This is particularly important since interaction between the saturated rubber particle(s) and the hot asphalt is accelerated because the resin reaches its liquid form faster than, for example, gilsonite. This accelerated interaction is especially important to the inventions ability to work in dry asphalt modifications and RAP rejuvenation.

RAP Modification

A random soft milled sample of "RAP" was provided to the laboratory. The asphalt had an estimated centipoise viscosity of 200,000. Crumb rubber processed from scrap tires, in a mesh range of 30-200, was prepared according to the stated hot/cold mix procedure. Mix compositions: Mix 1.70% crumb rubber –20% Total Petrochemicals "DMO"–10% Shell Oil S-15 wax Mix 2.70% crumb rubber –20% Total Petrochemicals "Resin"–10% Shell Oil S-15 wax. These two mixtures were blended into a 50/50 composition for use as a RAP modifier. An additional sample (64RAP40), was produced and used in the Semi-Circular Bend Test. This sample did not include the shell S-15 wax. The sample was comprised of two components of 80%-30 crumb rubber and 20% DMO and 20% Resin respectively. These materials were mixed at a 50/50 rate and employed at 10% of asphalt binder weight to produce the best performing sample in the "SCB" test. This test demonstrates the inventions ability to engineer pavement mixtures.

RAP Sample 1.

The laboratory sample of RAP was heated in a laboratory oven to 300° F. (149° C.). The RAP was moved from laboratory oven to a paddle mixer. Water was added to the RAP at by weight 1.5% to make up for losses during the heating process. The mixer paddles were engaged and the combined CRM modifier was added at a rate of 1.5% by weight of the total mixture. No new asphalt binder or aggregate were added. The mixture was blended for 90 seconds and the RAP changed color from gray to black and began to adhere to itself. The modified RAP was emptied into a lab tray and remained malleable to a temperature of approximately 200° F. (93° C.).

RAP Sample 2.

RAP sample 2 used the exact same materials and procedures described with sample 1. Upon discharge from the laboratory mixer the sample was placed in a gyroscopic compactor. The treated RAP mixture compacted in the standard 30 cycles. The resulting pavement sample was allowed to cure and visibly showed excellent adhesion and cohesion. The sample was then tested for indirect strain. The result was an outstanding 320 PSI tensile. The result was totally unexpected.

Thus, new and novel methodology for the modification and recycling of asphalt pavements was determined to have been achieved. Additional benefits are the savings in material costs and energy as well as the novel ability to both rejuvenate and modify asphalt(s) derived from the refining process of the crude oil streams from which they are produced. It is also anticipated the saturated rubber particles will eliminate the need to increase asphalt binder contents in CRM-modified dense-grade mix pavement designs by adding additional low viscosity oils and waxes into the pavement mixtures. The invention's rapid blending cycle will be effective as a low temperature elastomeric modifier for Warm Asphalt Mixtures ("WAM"). WAM Technology is rapidly growing in the pavement industry and lowers asphalt mixes temperatures from 30 to 50 degrees Fahrenheit. The result is more environmental hot mix asphalt lowering both energy requirements and emissions.

Experimental.

The Semi-Circular Bend test illustrates the resistance to intermediate fatigue cracking of pavement mixtures. Five pavement mixtures were prepared in the laboratory. Mix 76 CO was prepared utilizing Polymer modified PG 76-22 asphalt with all virgin material, mix 76 CRM was prepared using wet process PG 76-22 crumb rubber modified asphalt with virgin aggregates, mix 76RAP15 was prepared using PG 76-22 polymer asphalt with a 15% composition of, Recycled Asphalt Pavement, "RAP". The remaining two mixes were prepared using 40% "RAP" and PG 64-22 neet asphalt; the samples were further modified with the inventions saturated crumb rubber modifier added with the dry method (with aggregate). The saturated crumb utilized was comprised in two compositions. 1. 20% DMO saturated and 20% resin saturated crumb rubber further processed with 10% aliphatic wax. 2. 20% DMO saturated and 20% resin saturated crumb rubber without the wax. The saturated crumb rubber modifier(s) were used at a rate of 10% by weight of the asphalt composition of the pavement mixture(s). Any pavement mixture that scores over .65 is considered to show a good pavement wear indication. It is interesting to note the improvement by varying the saturated rubber combination as well as the equaling performance when compared to the premium PG 76-22RAP15 mixture. Chemical extraction was preformed on the sample(s) 64RAP40 yielding asphalt binder graded at PG 70-28.

I claim:

1. A saturated elastomeric mixture for use in the modification of neet asphalt and the rejuvenation of recycled or oxidized asphalt, comprising:
    a mixture consisting of:
    a cured or vulcanized elastomer crumb rubber; and
    one or more petroleum saturate agents consisting of: atmospheric distillations bottoms residue from the refining of crude oil, vacuum tower bottoms residue from the refining of crude oil, aromatic extracts from the refining of crude oil, paraffinic extracts from the refining of crude oil, used or recycled motor oil, wherein the amorphous elastomer crumb rubber absorbs one or more of the distillations, wherein there is included the addition to the mixture of paraffinic, microcrystalline or aliphatic wax(s) characterized by melting points above 150° F. (65° C.), yielding a pulverulent mixture.

2. A saturated elastomeric mixture for pavement and neet asphalt, comprising:
    first, a cured or vulcanized elastomer crumb rubber is included;
    second, a liquid refinery fractions mixture, absorbed in amorphous crumb rubber for use in the modification of neet asphalt and the rejuvenation of recycled or oxidized asphalt;
    a mixture consisting of:
    a cured or vulcanized elastomer crumb rubber; and
    one or more petroleum saturate agents consisting of atmospheric distillations bottoms residue from the refining of crude oil, vacuum tower bottoms residue from the refining of crude oil, aromatic extracts from the refining of crude oil, paraffinic extracts from the refining of crude oil, used or recycled motor oil, wherein the amorphous elastomer crumb rubber absorbs one or more distillations; and wherein the petroleum saturate agent of the mixture in total or part consists of the aromatic hydrocarbons having carbon numbers in the range of C20-50 and include N-methylpyrrolidone, phenol N-N-dimethylformamide, imethylsulfoxide, methlcarbonate, morpholine, and furfural—having an aromatic content of from 50%-90% by weight.

3. The saturated mixture of claim 1, wherein the wax component is typified by a melt temperature above 150° F. (65° C.) and is:

wax produced using the "Fischer Tropsch" process typified by long-chain aliphatic hydrocarbon with molecular chain length from 40-115 carbon atoms.

4. A saturated elastomeric mixture for use in the modification of neet asphalt and the rejuvenation of recycled or oxidized asphalt, comprising:

a mixture consisting of:

a cured or vulcanized elastomer crumb rubber: and one or more agents consisting of: atmospheric distillations bottoms residue from the refining of crude oil, vacuum tower bottoms residue from the refining of crude oil, aromatic extracts from the refining of crude oil, paraffinic extracts from the refining of crude oil, used or recycled motor oil, wherein the elastomer crumb rubber absorbs one or more of the distillations, wherein said crumb rubber is about 40% to 90% by weight of the mixture.

5. The saturated mixture of claim 1, wherein said wax is about from 1% to 30% by weight of the mixture.

* * * * *